Figure 4:
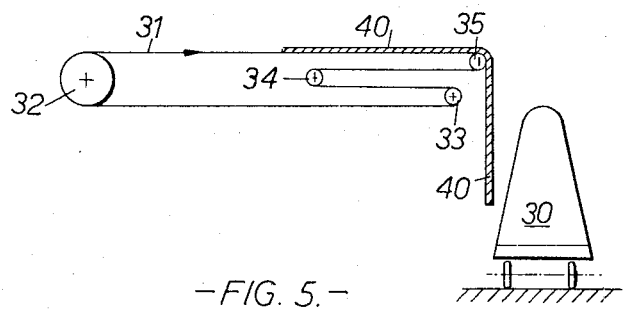
Figure 5:
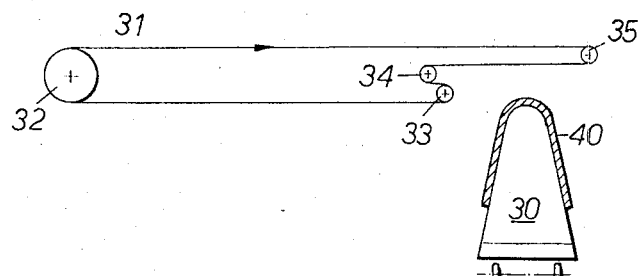
Figure 6:
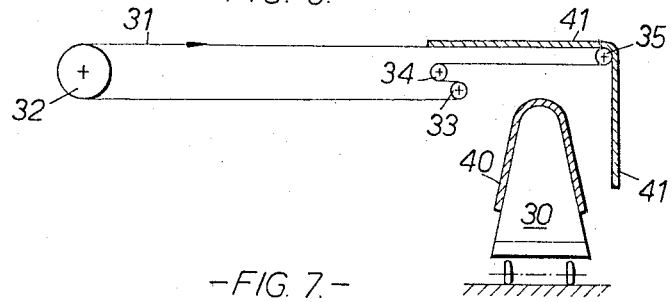
Figure 7:
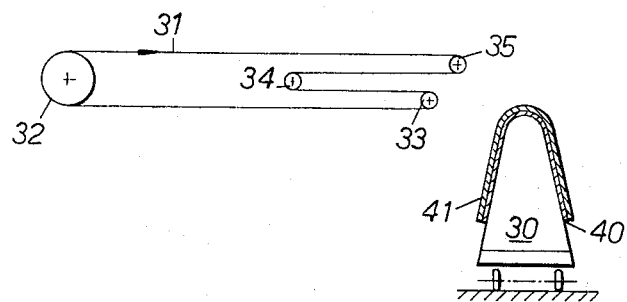

Oct. 25, 1966    H. T. BRIDGE    3,281,146
STACKING OR TRANSFER DEVICES
Filed Jan. 30, 1964    2 Sheets-Sheet 1
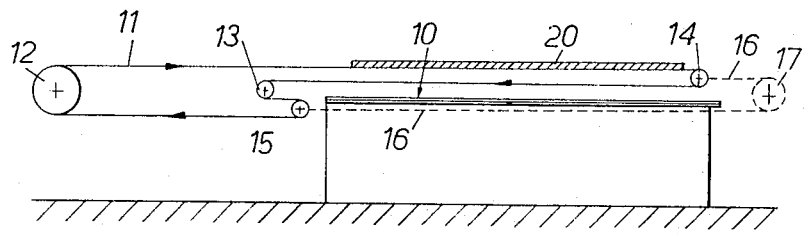
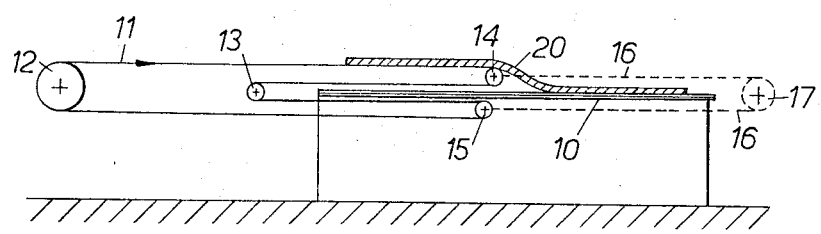
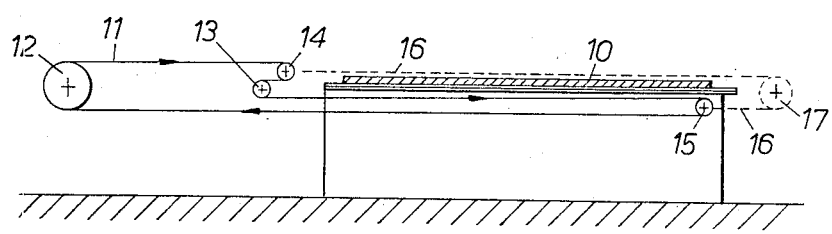
INVENTOR:
HENRY THOMAS BRIDGE
BY
Linton and Linton
ATTORNEYS Oct. 25, 1966

H. T. BRIDGE 3,281,146

STACKING OR TRANSFER DEVICES

Filed Jan. 30, 1964

2 Sheets-Sheet 2

INVENTOR:
HENRY THOMAS BRIDGE
BY
Linton and Linton
ATTORNEYS

United States Patent Office 3,281,146
Patented Oct. 25, 1966

3,281,146
STACKING OR TRANSFER DEVICES
Henry Thomas Bridge, Liverpool, England, assignor to Edward Wilson & Son Limited, Lancashire, England, a British company
Filed Jan. 30, 1964, Ser. No. 341,189
Claims priority, application Great Britain, Feb. 2, 1963, 4,357/63
5 Claims. (Cl. 271—68)

This invention relates to apparatus for stacking or transferring individual work-pieces of spread-out flexible nature, and more particularly to the stacking or transferring of hides or skins as they are consecutively presented either mechanically or manually.

In the tanning industry, hides and skins require to be stacked temporarily between the various steps in the processing of same, usually over so-called "horses," or on trucks, or pallets, or tables, and in various dispositions, e.g. grain side up or flesh side up, and the manipulating of hides and skins manually to obtain the required positioning involves much labour and time due to their weight and length and the necessity for avoiding the formation therein of creases and wrinkles. Further, hides and skins require frequently to be transferred individually from one conveyor means to another, or from one situation to another. Machines adapted to effect mechanically such handling of hides or skins have heretofore been proposed, but are generally of a complicated nature and are costly to install and maintain.

The present invention has for its object to provide relatively simple and inexpensive stacking and/or transfer apparatus having an enhanced versatility and flexibility in use as compared with known means.

Broadly, stacking or transfer apparatus according to the invention, comprises an endless conveyor having a work-piece receiving end and a discharge end, and a receiving surface, and said conveyor is characterised in that the discharged end thereof is adapted for extending and retracting movement relative to the main body of the conveyor.

The conveyor belt can be of any suitable kind having regard to the nature and state of the work-pieces to be handled, being for example of mesh or stranded type, and movement of the reciprocating discharge end can be automatically or/and manually timed as convenient. In some circumstances said conveyor is arranged with more than one reciprocable discharge portion.

The invention is further described with the aid of the accompanying drawings which illustrate diagrammatically, and by way of example only, two modes of embodiment.

In said drawings:

FIGS. 1 to 3 inclusive, illustrate, by way of side elevations, three positions of a conveyor transfer means arranged to lay or transfer work-pieces one at a time onto a planar receiving surface.

FIGS. 4–7 inclusive illustrate four positions of an alternative embodiment adapted to stack or drape work-pieces over a support such as a horse.

Referring now to the apparatus of FIGS. 1 to 3, this is particularly suited to the laying of consecutively presented hides or skins one at a time onto a table, or a co-operating secondary conveyor, or other receiving surface 10, and comprises an endless belt 11 or appropriate width carried by and running around rollers 12, 13 14 and 15. In this instance the rollers 12 and 13 are journalled in fixed bearings and said rollers 14, 15 are journalled in bearings which are displaceable (being suitably guided) fore and aft in a controlled manner in directions normal to their axes of rotation.

Said rollers 14, 15 are connected at each side by a chain 16 which passes round a driving sprocket 17, and thus when the sprockets 17 are rotated, roller 14 will be moved to the right (or left) and roller 15 correspondingly moved to the left (or right), according to the direction of rotation of the sprockets 17.

In use, one method of operation is as follows: A work-piece 20, e.g. a hide or skin, placed on the conveyor 11 is carried to the position shown in FIG. 1 with roller 14 in its fully extended position and with roller 15 retracted to provide for such extension. As soon as the skin 20 reaches this position, movement of the belt 11 ceases and, through the medium of the sprockets 17, roller 14 is retracted (and roller 15 advanced) whereby the skin 20 is progressively laid in a smooth unwrinkled state upon the receiving surface 10 situated below same. FIG. 2 illustrates the apparatus with roller 14 midway between its limiting positions, and FIG. 3 roller 14 in its fully retracted state with the skin 20 laid upon the receiving surface 10. Thus, skins placed or fed one at a time onto the receiving end of the conveyor belt 11 will be discharged successively onto the receiver 10 in a spread-out unwrinkled state. The receiver 10 may be constituted by a table, or pallet, or the operative run of a subsidiary conveyor.

In an alternative method of operation, instead of roller 14 being immediately re-extended preparatory to dealing with and in respect of each subsequent skin, alternately presented skins can be fed by the belt 11 over the retracted roller 14 on to the extended belt portion running over roller 15 (FIG. 3) whereby, in retraction of said roller 15, the skin may be laid on a second receiver positioned below the receiver 10, as for example onto a second conveyor means, or a second table.

It will be seen that transfer means as described may, by increasing the number of displaceable rollers, be provided with three or more extendible and retractable discharge portions and be employed to feed work-pieces onto a series of conveyors or tables or other receivers arranged in tiers.

FIGS. 4 to 7 inclusive illustrate an embodiment of the invention suited to the uniform stacking or draping of hides or skins over a support such as a horse 30. To this end the apparatus comprises an endless conveyor belt 31 moving around fixed rollers 32, 33, and rollers 34, 35 which, whilst being fixed relatively to each other, are adapted for reciprocating movement.

One method of operation is as follows: A skin 40 placed on the conveyor belt 31 is progressed over the end roller 35—which is arranged to be above and to one side of the horse 30—until about one third of said skin hangs free as shown in FIG. 4. The roller 35 (as also roller 34) is now moved by any suitable means to the position shown in FIG. 5 whereby, in continued movement of the belt 31, the skin 40 is laid over the horse as shown. A next skin 41 is now fed forward by the conveyor to the position shown in FIG. 6, so that, in retraction of the roller 35 to the position shown in FIG. 7, it is placed on the horse over the preceding skin 40. This cycle of events is repeated as required.

In an alternative mode of operation, the roller 35 may, if desired, be retracted prior to the feeding forward of each skin so that said skins are all draped over the horse from the same side, in which case they will be stacked flesh side to grain side. For the majority of tanning processes however it is preferred that skins are stacked grain to grain and flesh to flesh.

Apparatus according to the invention can be powered in any convenient manner, and the timing of the conveyor belt's movement and the extending and retracting of the discharge end or ends thereof can be achieved automatically in synchronism with co-operating apparatus, or by sensory devices positioned so as to detect in known manner the presence and positions of work-pieces to be handled. Alternatively, or in addition, the apparatus may be adapted for manual control.

The displaceable rollers of stacking or transfer means according to the invention may be adapted for linear or arcuate or other movement as found convenient.

What I claim as my invention and desire to secure by Letters Patent is:

1. Stacking or transfer apparatus for the purpose specified comprising an endles conveyor having a work-piece receiving end and a discharge end, and a receiving surface positioned adjacent to the discharge end, said endless conveyor being characterised in that it is guided around at least two fixed rollers, at least two rollers which are displaceable in directions normal to their axes of rotation, and at least one of said displaceable rollers being at the discharge end of said conveyor whereby said discharge end may be at times extended over said receiving surface, and at times retracted therefrom, while said other displaceable roller is arranged to be moved correspondingly whereby tension in said conveyor is maintained substantially constant.

2. Stacking or transfer apparatus as claimed in claim 1, wherein said displaceable rollers are arranged so as to move in opposite directions during the extending and retracting of the conveyor's discharge end.

3. Stacking or transfer apparatus, as claimed in claim 1, wherein said displaceable rollers move in the same direction during the extending and retracting of the conveyor's discharge end.

4. Stacking and transfer apparatus, as claimed in claim 1, wherein said receiving surface is planar and said discharge end of the conveyor is arranged to be extended alternately above and below said receiving surface.

5. Stacking and transfer apparatus, as claimed in claim 3, wherein said receiving surface comprises a support over which work-pieces can be draped and the discharge end is arranged to be reciprocated above same.

References Cited by the Examiner
UNITED STATES PATENTS

| | | | |
|---|---|---|---|
| 1,711,827 | 5/1929 | Berry | 271—73 X |
| 3,198,513 | 8/1965 | Farez | 271—68 X |

M. HENSON WOOD, JR., *Primary Examiner.*

J. N. ERLICH, *Assistant Examiner.*